Jan. 21, 1958  W. F. ROTH  2,820,579
COMBINED VALVE AND MEASURING CHAMBER
Filed Feb. 11, 1954
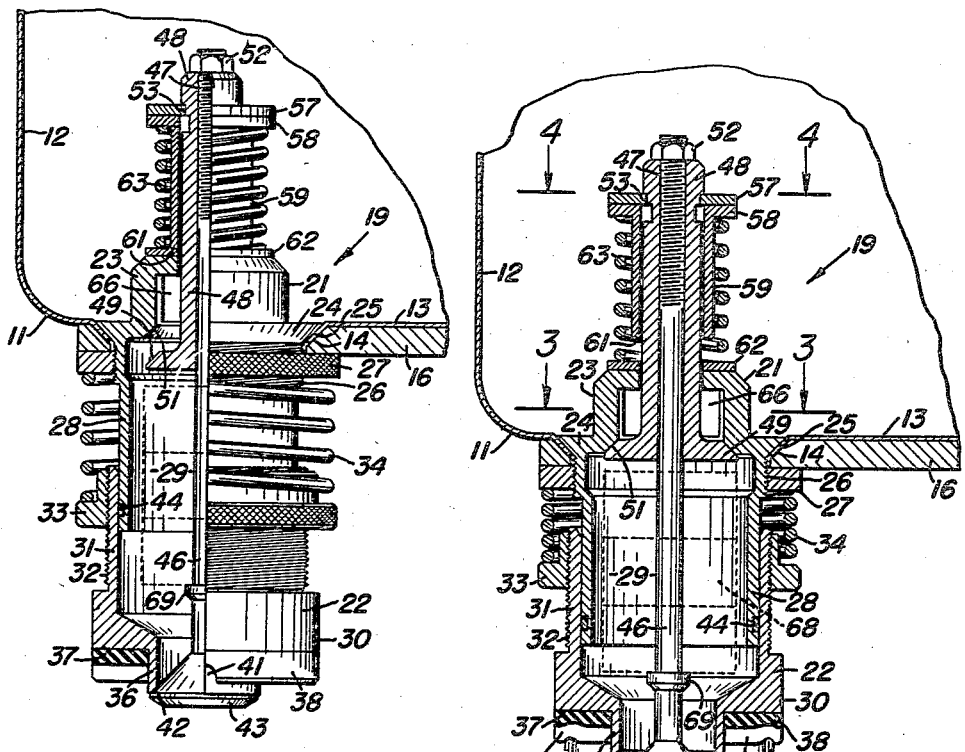
FIG. 1.   FIG. 2.
FIG. 3.   FIG. 4.
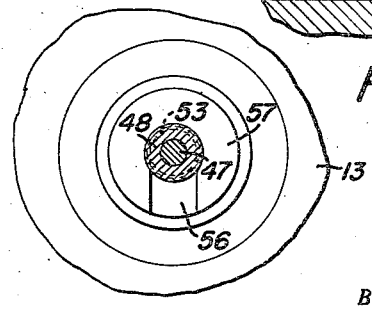
INVENTOR.
WILLIAM F. ROTH
BY
ATTORNEY United States Patent Office 2,820,579
Patented Jan. 21, 1958

2,820,579

COMBINED VALVE AND MEASURING CHAMBER

William F. Roth, Rochester, N. Y., assignor to The Pfaudler Company, Rochester, N. Y., a corporation of New York Application February 11, 1954, Serial No. 409,554

3 Claims. (Cl. 222—440)

My invention relates to valves and more particularly to a combined valve and measuring chamber adapted to dispense a predetermined volume of liquid.

While the valve structure of my invention has other uses and may be applied to liquid holding tanks generally as for example, if it is desired to withdraw a measured quantity of liquid for sampling purposes, it has primarily been designed for use in connection with filling machines particularly those of the general type shown in United States Letters Patent No. 2,241,672 issued May 13, 1941 to Everett S. Minard entitled "Filling Machine."

The gravity type filling machine of that patent is adapted to filling containers with free flowing or relatively thin liquids such as tomato juice, brine, wines, fruit juices, soups and the like. It comprises a rotatable reservoir having a plurality of openings spaced around the periphery of the bottom wall. These dispensing openings are closed by valves which are normally maintained closed by springs and are opened when a lifter plate upon which a can or other container to be filled is placed, is raised to compress the spring and open the valve. In the general type of filler with which the combined valve and measuring chamber structure of my invention is concerned, no adequate means has heretofore been employed for accurately controlling the volume of fill of the containers.

An object of my invention is to provide a relatively inexpensive valve and measuring chamber structure for application particularly to gravity type fillers which is simple and foolproof in operation.

Another object of my invention is to provide a combined valve structure and measuring chamber for application particularly to gravity type fillers wherein the measuring chamber is adjustable as to volume by an extremely fine adjustment to enable accurate control of the volumetric fill of the containers.

Another object of my invention is to provide a combined valve structure and measuring chamber for application to gravity type fillers which is adjustable in volume to readily adapt the filling machine for filling containers of various sizes.

More specifically, my invention contemplates a combined valve structure and measuring chamber in which two valves are employed mounted for conjoint action on opposite sides of a measuring chamber, the valves being so constructed and arranged that the discharge valve is normally closed and the valve between the liquid reservoir and the measuring chamber is normally open for the free flow of liquid from the reservoir into the chamber, the discharge valve being opened by the container when the supporting lifting plate is raised and the action of opening the discharge valve, closing the reservoir valve to insure accuracy of fill.

Other objects and advantages of my invention will be particularly set forth in the claims and will be apparent from the following description, when taken in connection with the accompanying drawings, in which:

Fig. 1 is a vertical view of the combined valve structure and measuring chamber of my invention partly shown in section and showing a part of the reservoir of the machine to which the valve structure of my invention is applied, the parts being shown in the position which they occupy when the discharge valve is open;

Fig. 2 is a sectional view taken through the combined valve and measuring chamber structure of my invention, the view being similar to Fig. 1 and the discharge valve being shown in the open position;

Fig. 3 is a sectional view taken substantially on the line 3—3 of Fig. 2 in the direction indicated by the arrows; and Fig. 4 is a sectional view taken substantially on the line 4—4 of Fig. 2 in the direction indicated by the arrows.

The combined valve structure and measuring chamber of my invention has been primarily designed for use in gravity type fillers of the general type shown in the above mentioned patent. However, the valve structure of my invention has other uses, for example, in the chemical, oil and food industries or wherever tanks are employed for storing or processing liquids or semi-liquids. When applied to a processing tank the valve structure of my invention may be used to withdraw a measured quantity of the liquid from the tank at any stage of the process for the purposes of obtaining a measured sample for analysis or observation.

The container filling machine with which the combined valve and measuring chamber structure of my invention is employed comprises a tank or reservoir 11 having vertically extending or tapered side walls 12 and a bottom wall 13. The bottom wall is provided with a plurality of spaced openings 14 extending around the periphery thereof, the material of the tank bottom wall being depressed at spaced intervals during the stamping out of the tank to receive the valve structures and to receive perforated reservoir support plate 16.

As more particularly described in the above mentioned patent, the reservoir 11 is rotated about a vertical axis by any suitable mechanism and the machine is provided with lifter plates 17 upon which the cans or other containers 18 are automatically deposited. It will be understood that the containers 18 are fed to and removed from the lifter plates 17 and that the lifter plates are raised and lowered in timed relationship by mechanism not shown to open and close the discharge valves to accomplish the container filling operation.

The valve structure comprises a valve body generally indicated by the numeral 19 formed of two major parts 21 and 22. The part 21 has a cylindrical portion 23, the lower part of which is enlarged as shown at 24. The under side of the part 24 is essentially frusto-conical in shape to form a wall 25 which mates with and seals against the frusto-conical depressed part defining the discharge opening 14 in the bottom wall of the reservoir.

Part 21 projects below the bottom wall 16 of the reservoir and the projecting end is threaded, as shown at 26, to receive a knurled nut 27 which when drawn tight and a suitable gasket is employed, seals the valve structure with respect to the bottom wall 13 of the reservoir. Below the threaded portion 26, the valve part 21 is extended to provide a cylindrical skirt or sleeve 28 which internally defines part of a measuring chamber 29 as will presently appear.

The valve part 22 has a cylindrical end 30 and also a cylindrical sleeve part 31 projecting upwardly and extending in external telescopic relation with the sleeve part 28 further to define the measuring chamber 29. The sleeve 31 of the valve part 22 is externally threaded, as shown at 32, to receive a knurled nut 33 having a relatively wide latitude of adjustment along the threads 32 of the sleeve 31 for a purpose which will presently appear.

A spring 34 has its upper end seated on the nut 27 and its lower end seated on an annular ledge formed on the nut 33. The spring 34 normally maintains the parts in the position shown in Fig. 1, that is, with the relationship of the sleeves extended and the volume of the measuring chamber 29 at a maximum. At its lowermost end the cylindrical portion 30 of the valve part 22 is decreased in diameter, as shown at 36, to form an annular face 37 adapted to receive an annular relatively soft rubber valve member 38. The valve member 38 is adapted to receive the thrust of the upper edge or lip 39 of a can or other container. The purpose of making the valve member 38 of rubber is to prevent damage to the lip of the can when the can is brought into valve opening relation with the valve member as shown in Fig. 2. The rubber valve member 38 is provided with one or more slots 41 to permit escape of air from the can as it is being filled with the material from the measuring chamber.

The lower end of the portion 36 of the valve part 22 has an internal frusto-conical seat 42 adapted to receive the correspondingly frusto-conical wall of a valve 43. The valve 43 defines the lower end of the measuring chamber.

The measuring chamber 29 is thus defined by a lower valve 42—43, an upper valve presently described and the sleeve-like members 28 and 31. The sleeve members are telescopically slidable with respect to each other to form a liquid tight side wall, the walls being sealed with respect to each other by an annular O ring 44 carried in an annular recess formed in the wall of one of the sleeves.

The valve member 43 is preferably formed integral with a valve stem 46 which extends upward through the measuring chamber 29 and at its upper end projects into the interior of the reservoir 11. The upper end of the valve stem 46 is threaded, as shown at 47, to receive internal threads formed on an upper valve stem 48. A valve element 49, preferably integral with the valve stem 48, has a frusto-conical seating surface adapted to engage a correspondingly shaped valve seat 51 formed internally of the valve part 21 adjacent the top of the measuring chamber 29.

It will now be understood that the valve elements 43 and 49 are arranged for conjoint action and that movement of the valve stem 46 will move both valve elements. The distance between the valve elements may be adjusted by threading the valve stem 48 inward or outward with respect to the valve stem 46. When the desired adjustment has been made the nut 52 is tightened down on the upper face of the valve stem 48 to hold the parts in a locked position and the valve elements 43 and 49 in the desired adjusted relation for purposes which will presently appear.

The valve stem 48 has a shoulder 53 and has a slot 56 (Fig. 4) for the reception of an annular snap lock 57. The snap lock 57 is only a partial annulus so that the free ends may lie in the slot 56 with the lock lodged beneath the shoulder 53. It is adapted to hold a valve spring retainer 58 in position. The valve spring retainer 58 has a tubular extension 59, the lower end 61 of which is adapted to seat upon a valve washer 62 which encircles the valve stem 48 at the upper end of the valve part 21. A spring 63 seats on the valve spring retainer and the valve washer 62 and normally urges the valve spring retainer in an upward direction to thereby through the valve stem 48 and the valve stem 46 urge the valve elements 43 and 49 into engagement with their respective seats 42 and 51.

From the foregoing, it will be understood that the parts are normally in the position shown in Fig. 1. For this purpose the spring 34 is considerably stronger than the spring 63 so that its action overcomes the action of the spring 63 and urges the valve part 22 downward so as to close the seat 42 against the valve 43. Pressure on the valve part 43 pulls the valve stems 46 and 48 downward until the lower end 61 of the spring retainer 58 engages the valve washer 62. With the parts in the position above described, the valve 42—43 is closed while the valve 49—51 is open. Liquid or semi-liquid from the reservoir 11 is then free to flow through ports 66 formed in the valve part 21 (Fig. 3) into the chamber 29. It will be understood that the machine rotates through a cycle of operation and that during a portion of this cycle the parts are in the relationship shown in Fig. 1. During this interval the measuring chamber 29 is filled, the parts being held in the relative position shown in Fig. 1 by the spring 34 overcoming the spring 63 as limited by the seating of the end 61 of the valve spring retainer 58 on the valve washer 62.

When the particular valve being considered reaches the point in the cycle of operation at which a can or other container is fed to the lifter plate 17, as more fully disclosed in the above mentioned patent, the lifter plate 17 is raised to urge the lip 39 of the can into engagement with the rubber valve member 38. This action compresses the spring 34 and lifts the valve seat 42 away from the valve element 43 and allows the spring 63 to close the valve 49—51. It will be understood that as the valve seat 42 moves upward, the valve element 43 follows it under the urging of the spring 63 until the valve element 49 engages its seat 51. The parts then assume the position shown in Fig. 2 in which position of the parts the reservoir valve 49—51 is closed and the discharge valve 42—43 is open. Liquid may then freely flow out of the measuring chamber 29 into the can to be filled.

Since the valve element 49 must engage its seat 51 before the discharge valve 42—43 can open, the volume of the measuring chamber is always the same for any particular setting of the parts. The amount which the discharge valve will open after the valve 49—51 seats is determined by the throw of the lifter plate which is adjustable as set forth in the above mentioned patent. Thus a measured volume of liquid may be discharged from the measuring chamber 29. Similarly when the parts are moved from the position shown in Fig. 2 to that shown in Fig. 1, that is, when the discharge valve is to be closed, downward movement of the valve part 22 with respect to the valve part 21 which results when the can is filled and the lifter plate is lowered, causes downward movement of the valve part 49. However, the discharge valve must close before the valve 49—51 can open because a downward movement of the valve stem 46 must occur before the valve 49—51 can open.

It will be understood from the foregoing that when the parts are moved from the position shown in Fig. 1 to that shown in Fig. 2, the volumetric capacity of the measuring chamber 29 decreases due to the telescopic movement of the valve parts 21 and 22 with respect to each other. However, for any fixed relationship of the parts, the valve 49—51 closes at a predetermined point in the movement of the parts. The volume of the chamber 29 at the instant of closing the valve 49—51 determines the volumetric capacity of the chamber 29 and hence the volumetric fill. It will further be appreciated that as the chamber walls telescope, the excess material in the measuring chamber 29 is pushed upward out of the chamber into the reservoir 11 by the valve element 42 acting as a piston. Thus the measuring chamber 29 is filled with a quantity of a liquid in excess of that which is to be placed in the container and during upward movement of the valve this excess is returned to the reservoir or to a position above the valve 49. The advantage of this arrangement is that complete filling of measuring chamber with the desired amount of liquid is assured. Moreover, to a large extent air bubbles are removed.

Accuracy of fill and adjustment thereof is obtained by adjusting the valve stem 48 with respect to valve stem 46. This may be easily accomplished by loosening the lock nut 52 and threading inward or outward on the valve stem 48. This adjustment determines the particular point in the upward movement valve part 22 and the valve stem 46 at which the valve 49—51 will close. The point at which the valve 49—51 closes determines the volumetric capacity of the chamber 29. This adjustment is extremely fine. Large adjustments in volumetric fill are made by mounting filler pieces 68 in the measuring chamber. These filler pieces may be supported on a shoulder 69 formed on the valve stem 46.

The combined valve and measuring chamber may be employed in connection with filling containers of various sizes. As mentioned in the above mentioned patent the throw of the lifter plate is adjustable. By adjusting the valve stems with respect to each other to increase the volume of the measuring chamber, larger sizes of cans may be filled. By adjusting the valve stems and by the use of filler pieces 68 or both, smaller sizes of cans may be filled.

While I have shown and described the preferred form of my invention, it will be appreciated that various changes may be made, particularly in the form and relation of parts, without departing from the spirit of my invention as set forth in the appended claims.

I claim:

1. A valve structure for use in connection with a receptacle for flowable material having an opening for the reception of the valve structure comprising, in combination, a valve body having a chamber therein, means for adjusting the volumetric capacity of said chamber to control the volume of material withdrawn from said chamber, said chamber body having an opening between the receptacle and the chamber adjacent the top of the chamber and an opening for the discharge of material from the chamber adjacent the bottom of the chamber, a valve for closing each of said openings, a valve stem upon which both of said valves are rigidly mounted in spaced relation for conjoint action, spring means for normally maintaining the discharge valve closed and the other valve open and means for closing said other valve prior to the opening of the discharge valve, the means for adjusting the volumetric capacity of said valve comprising means for varying the distance between said valves.

2. A valve structure for use in connection with a receptacle for flowable material having an opening for the reception of the valve structure comprising, in combination, a valve body having a chamber therein, said chamber being formed by two sleevelike members telescopically slidable with respect to each other, said valve body having an opening between the receptacle and the top of said chamber and an opening for the discharge of material from the chamber, a valve for closing each of said openings, a valve stem upon which both of said valves are mounted in spaced relation for conjoint action, a spring for moving one of said sleevelike members toward said discharge valve to close off the discharge from the chamber, a second spring normally urging said second valve toward closed position, said second spring being weaker than the discharge valve spring whereby the discharge valve is normally closed and the second valve is normally open, and means for decreasing the effective length of said valve stem to decrease the volumetric capacity of said chamber.

3. A valve structure for use in connection with a receptacle for flowable material having an opening for the reception of the valve structure comprising, in combination a valve body having a chamber therein, means for varying the volumetric capacity of said chamber, an inlet valve from the receptacle to the chamber, an outlet valve from the chamber, means for normally maintaining the chamber at its maximum volumetric capacity and with the outlet valve closed and the inlet valve open, means for closing said inlet valve and thereafter opening said discharge valve during the operation of said volumetric capacity varying means from maximum chamber capacity toward minimum chamber capacity, both of said valves being rigidly secured to said valve stem and means for varying the distance between said valves to vary the volumetric capacity of said chamber.

References Cited in the file of this patent

UNITED STATES PATENTS

| | | |
|---|---|---|
| 576,241 | Van Arne | Feb. 2, 1897 |
| 809,439 | Goeb | Jan. 9, 1906 |
| 1,456,854 | McGhee et al. | May 29, 1923 |
| 2,307,223 | Kerr | Jan. 5, 1943 |
| 2,341,950 | Schepps | Feb. 15, 1944 |
| 2,463,922 | Turner | Mar. 8, 1949 |
| 2,652,965 | McGihon | Sept. 22, 1953 |